(12) United States Patent
Smith

(10) Patent No.: US 7,762,743 B2
(45) Date of Patent: Jul. 27, 2010

(54) DISTRIBUTED TEMPERATURE SENSING IN A REMOTELY OPERATED VEHICLE UMBILICAL FIBER OPTIC CABLE

(75) Inventor: Peter Mark Smith, Singapore (SG)

(73) Assignee: Weatherford/Lamb, Inc., Houston, TX (US)

( * ) Notice: Subject to any disclaimer, the term of this patent is extended or adjusted under 35 U.S.C. 154(b) by 266 days.

(21) Appl. No.: 11/935,860

(22) Filed: Nov. 6, 2007

(65) Prior Publication Data

US 2008/0110389 A1    May 15, 2008

Related U.S. Application Data

(60) Provisional application No. 60/864,543, filed on Nov. 6, 2006.

(51) Int. Cl.
     *B63C 11/00*      (2006.01)
     *G01K 3/00*      (2006.01)

(52) U.S. Cl. .................. 405/191; 405/190; 374/137

(58) Field of Classification Search .......... 405/185, 405/190, 191; 73/170.29, 170.33; 374/137
See application file for complete search history.

(56) References Cited

U.S. PATENT DOCUMENTS

| | | | |
|---|---|---|---|
| 4,682,913 A * | 7/1987 | Shatto et al. ............. | 405/169 |
| 5,449,233 A | 9/1995 | Sai et al. | |
| 2003/0010404 A1* | 1/2003 | Mossman et al. ......... | 144/335 |
| 2003/0150201 A1* | 8/2003 | Matheson ................. | 57/10 |
| 2003/0234921 A1 | 12/2003 | Yamate et al. | |
| 2005/0140966 A1* | 6/2005 | Yamate et al. ............ | 356/73.1 |
| 2006/0001863 A1* | 1/2006 | Kishida et al. ............ | 356/136 |
| 2006/0157239 A1* | 7/2006 | Ramos et al. ............ | 166/254.2 |

FOREIGN PATENT DOCUMENTS

| | | |
|---|---|---|
| GB | 2 398 444 | 8/2004 |
| WO | WO 2004/007910 | 1/2004 |
| WO | WO 2004/029568 | 4/2004 |
| WO | WO 2004/083595 | 9/2004 |
| WO | WO 2008/001046 | 1/2008 |

OTHER PUBLICATIONS

GB Search Report, Application No. GB 0721681.5, dated Jan. 23, 2008.

* cited by examiner

*Primary Examiner*—David J Bagnell
*Assistant Examiner*—Benjamin Fiorello
(74) *Attorney, Agent, or Firm*—Patterson & Sheridan, LLP

(57) ABSTRACT

Methods and apparatus for monitoring a remotely operated vehicle umbilical condition in real time allowing for improving of power delivery as well as early detection of threats to integrity of the umbilical. The umbilical may include an optical fiber. Processing equipment may enable distributed temperature sensing along the optical fiber.

8 Claims, 5 Drawing Sheets

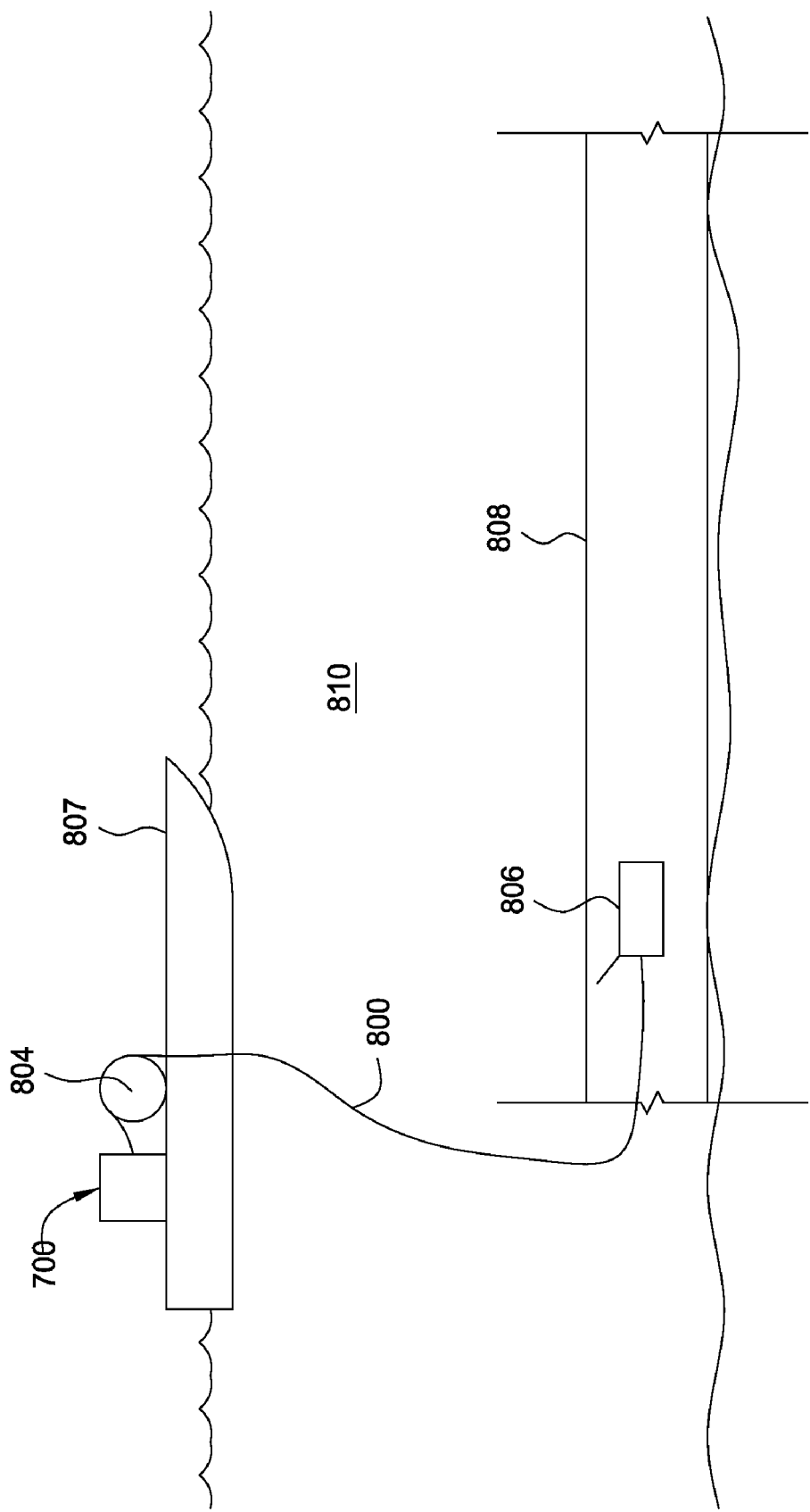

DISTRIBUTED TEMPERATURE SENSING IN A REMOTELY OPERATED VEHICLE UMBILICAL FIBER OPTIC CABLE

CROSS-REFERENCE TO RELATED APPLICATIONS

This application claims benefit of U.S. provisional patent application Ser. No. 60/864,543, filed Nov. 6, 2006, which is herein incorporated by reference in its entirely.

BACKGROUND OF THE INVENTION

1. Field of the Invention

Embodiments of the invention generally relate to an umbilical for use with a remotely operated vehicle.

2. Description of the Related Art

A remotely operated vehicle (ROV), such as used in offshore oil/gas exploration/production, utilizes an umbilical to connect to and/or power the vehicle. However, the umbilical can create a source for potential failure. For example, the umbilical can overheat since operators lack any indication as to umbilical core temperatures that occur under loading (e.g., resistive loading and self heating caused by eddy currents in a drum upon which the umbilical is wound). Repeated winding on and off the winch and dynamic changing mechanical tension of the cable may affect ability to measure this temperature even at point locations along the umbilical.

Therefore, there exists a need to be able to measure the inner core temperature of an umbilical while it is in operation and loaded. A further need exists for providing a spatial understanding of where the heat is generated.

SUMMARY OF THE INVENTION

Recent advances in fiber optic technology have been developed that permit the measurement of temperature along a multi-mode fiber optic cable with no external electronics. Such technology provides the ability for an ROV operator to determine the actual spatial temperature gradient of an umbilical core over the length of the umbilical. The application of such technology allows the ROV operators and systems designers to select and engineer the umbilical with much closer tolerances providing more efficient use of one of the expensive components of a ROV system. Furthermore, the technology promises the ability to monitor an umbilical condition in real time allowing for improvement of power delivery as well as early detection of threats to an umbilical's integrity. The following description explains the basic physics behind such a technology and also analyzes what an umbilical temperature gradient would look like as well as providing a practical list of the equipment that may be included.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 is a schematic view of an umbilical used in one embodiment.

DETAILED DESCRIPTION

Figure 1:
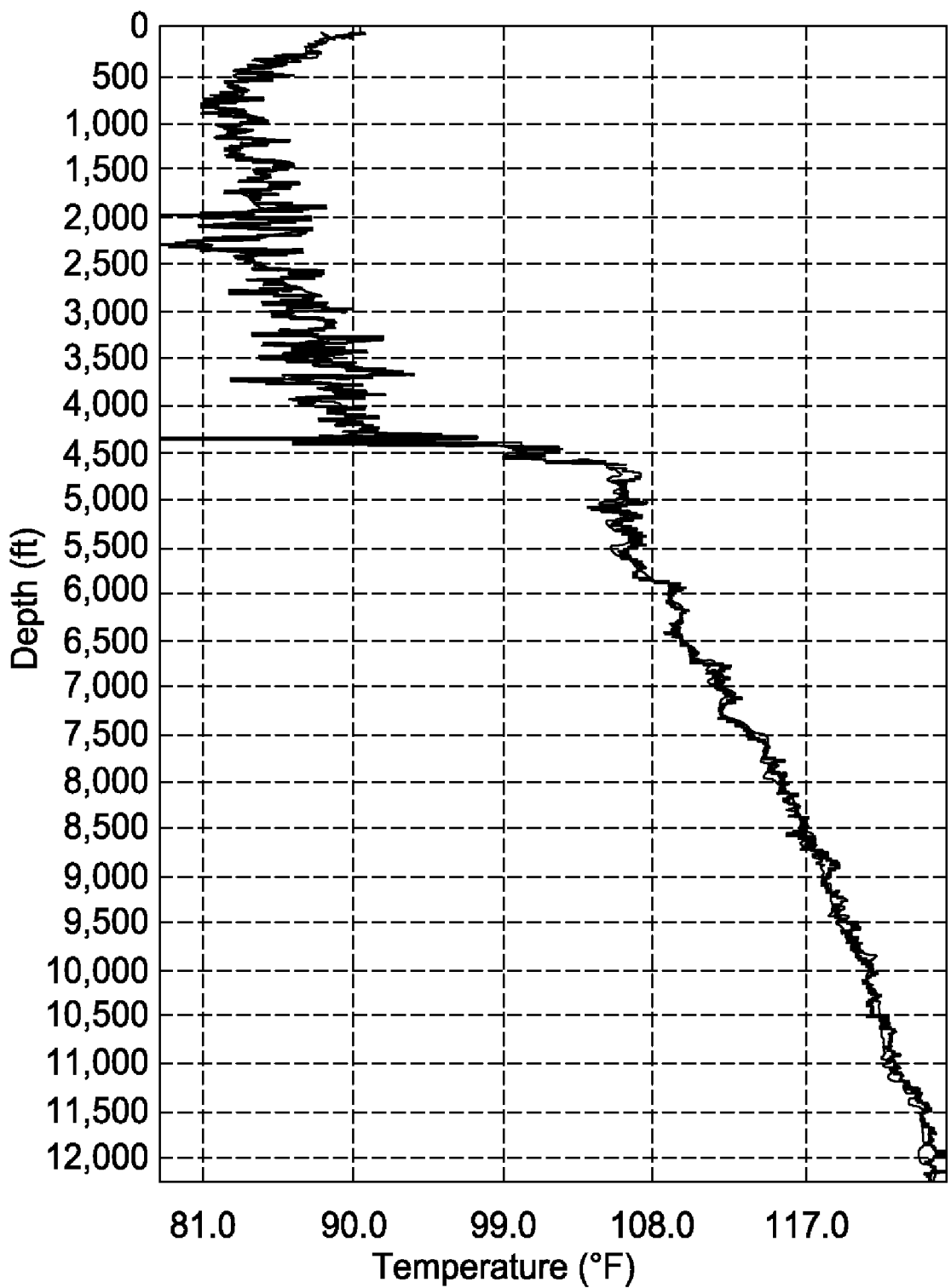
FIG. 1 is an example of an actual thermal gradient produced from a distributed temperature sensing (DTS) system used for down-hole temperature measurements in an oil well.

One issue with remotely operated vehicle (ROV) umbilical designs is that the electrical power available to a ROV is ultimately limited by the delivery capability of the umbilical. The umbilical limit constrains the amount of power for the vehicle. Although an umbilical may be sized in theory to provide any level of power, the weight and size of such an umbilical becomes impractical. In practice, any umbilical having a diameter over 43 mm may be considered unfeasible. Furthermore, the cost of an umbilical increases as the copper commodity prices rise. Therefore, limiting the diameter of the umbilical, while maximizing the power supplied to the ROV is critical in the design of the umbilical.

Some constraints that face an umbilical designer include: power required, weight in water and air, bending radius (and hence maximum diameter), number of additional signals, and length of umbilical required. One of the main factors taken into consideration in a new vehicle design is the power required for the vehicle. The power required effects the amount of heat generated in the umbilical and the insulation required for the umbilical. The more power the ROV draws through the power conductors of an umbilical, the hotter the umbilical will become during operation. To reduce the heat in the umbilical, the size of the conductors and thereby the umbilical may be increased. However, the up sizing of the conductors directly affects the bending radius and weights in water and air of the umbilical. Increasing the voltage of the ROV system is a strategy that has been used to some effect (i.e., going from 1.2 kV to 3 kV to 6 kV); however, the possibility of arcing corona effects, inadequate conductor insulation, and safety concerns become an issue at voltages much higher than these. Further, the switch gear size for high voltage ROV's becomes far too large for offshore use.

Another issue that arises with ROV designers involves the length of the umbilical that is most likely to be deployed versus the length of the umbilical left on the winch drum in actual operation. This is because the umbilical left on the drum suffers more heat stress than the deployed umbilical. The reason the umbilical on the drum suffers more heat stress is due to lack of cooling and self heating through inductance in the steel drum. Although quite often ROV designers are called on to design deep systems with 1000 meters (m) or 3000 m umbilical lengths, it is not unusual for these same systems to operate in shallow waters (e.g., on a pipeline survey) where most of the umbilical is not deployed but remains on the drum. In this situation, the umbilical may suffer heat damage should the ROV be used to the full design capability wherein the design capability is intended for the umbilical to be mostly deployed.

The end result is that ROV umbilical selection is conservative at an added wasteful expense. In order to reduce the wastefulness of an overdesigned umbilical, a temperature monitoring system may be put into place on the umbilical.

Thus, the internal temperature of a ROV umbilical may be monitored during operation and deployment of the ROV. Further, the system may alert an operator or a control system when a ROV umbilical core temperature reaches a critical point. In one embodiment, the critical point is approximately 70% of the melting point of XLPE insulation; however, it should be appreciated that any critical point may be set depending of the umbilical, the operation, and the materials used.

The advantages of knowing what the temperature gradient of an umbilical in real time include the following aspects.

The designer and operator know where the weak points are in an umbilical because poor conductance generates heat. Such knowledge may also help prevent excessive cut backs of the umbilical when re-terminations are made.

It is possible to determine where water ingression may have occurred. Ingress of water will reduce temperature of an umbilical core in the section of umbilical that is flooded.

The operator and designer can determine very accurately the core temperature of an umbilical on a winch drum, thus electrical loading for drum designs can be better optimized for cooling. Furthermore, as the ROV power control systems design improves (due to use of VFD's and semiconductor power electronics), it may be possible to dynamically alter the umbilical input voltages and frequencies to provide best power available at minimum heat generated.

Early warning of umbilical insulation failures due to excessive turns could be detected. Excessive turns usually involve crimping of the umbilical (knotting). Such failures typically result in power conductor insulation damage. Such damage causes cross over (arcing), which would result in a temperature spike on the thermal gradient.

Figure 2:
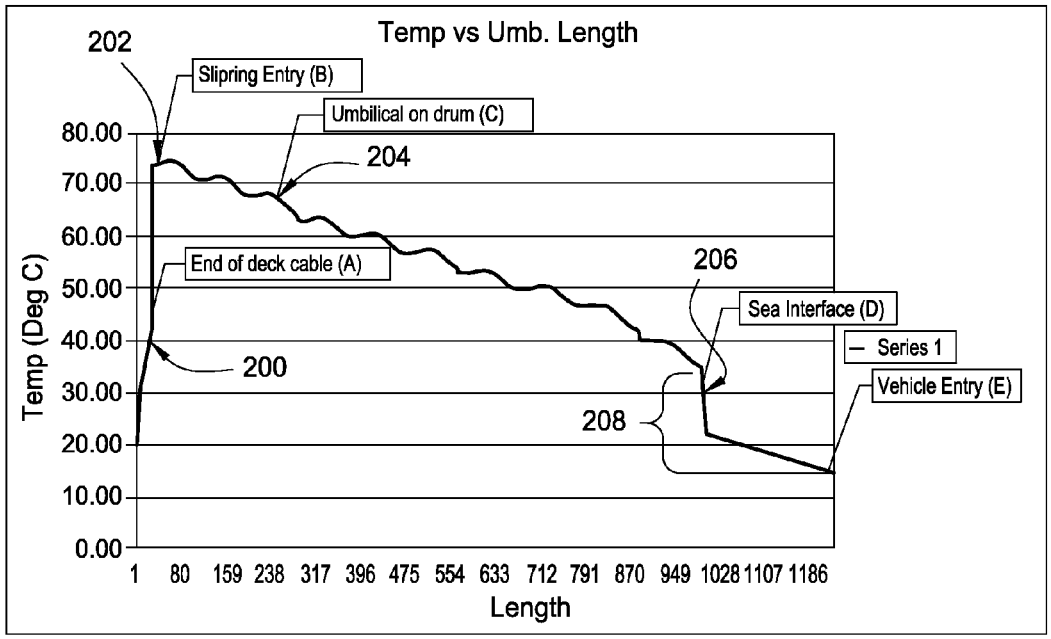
FIG. 2 is a proposed ROV umbilical temperature gradient.

FIGS. 1 and 2 respectively show an example of an actual thermal gradient produced from a distributed temperature sensing (DTS) system used for down-hole temperature measurements in an oil well and a proposed ROV umbilical temperature gradient. In this theoretical DTS trace, the following elements can be seen:

A. Heating of the deck cable on deck 200.

B. The entry in a hot winch drum via the rotary slip ring 202.

C. The sinusoidal characteristic expected of an umbilical installed on a winch drum 204.

D. A sharp cooling off as the umbilical enters the sea interface 206.

D to E A gradual reduction in temperature depending on the sea thermal gradient.

F. An increase in temperature as the umbilical enters a warm junction box.

Figure 3:
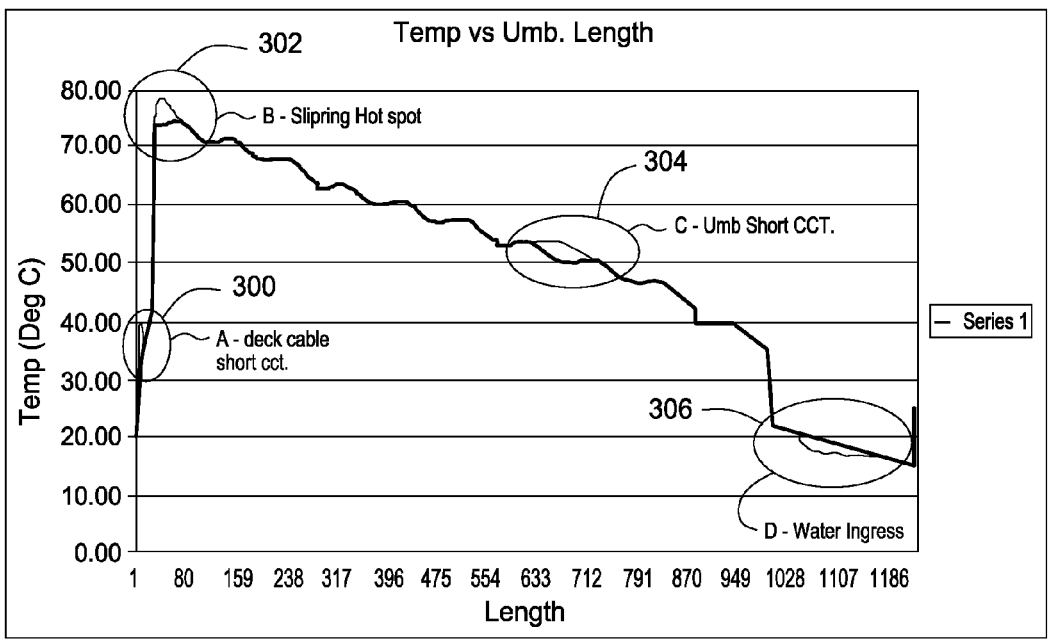
FIG. 3 is a graph showing theoretical faults that may be able to be spotted with a DTS survey.

FIG. 3 shows theoretical faults that may be able to be spotted with a DTS survey. The graph includes faults as follows.

A. A hot spot caused by a deck cable short 300.

B. A hot spot present in a slip ring 302.

C. A hot spot caused by an umbilical kink/short circuit or arcing 304.

D. A low spot (cooling) caused by water ingress 306.

These "hot spots" may appear in practice as gradual inclines—for this reason DTS trace viewers may allow the play back of traces against a base line.

Figure 4:
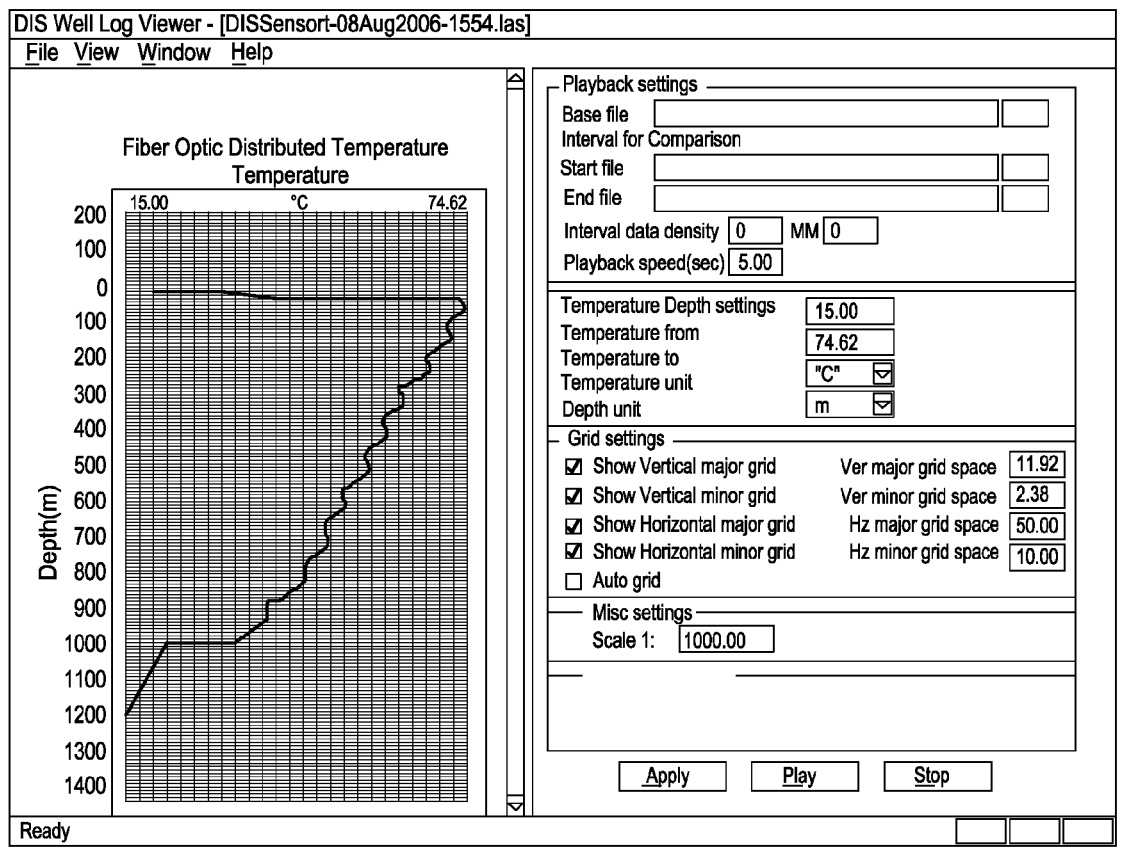
FIG. 4 is a DTS log view.

FIG. 4 shows a DTS log view. For some embodiments, an application plots the graph with the depth on the Y axis and the temperature on the X axis.

Some ROV umbilicals in existence utilize fiber optic communication cables. Therefore, by changing the recording instrumentation at one or both ends of the fiber an existing ROV umbilical having a fiber may be utilized for measuring core temperature throughout the umbilical with a spatial resolution of 1.0 meter with accuracies of 0.1 degrees Celsius possible. Further, an umbilical may be manufactured with a DTS fiber. Further, any fiber optic (e.g., a communication line or a dedicated DTS line) within an ROV umbilical may be used for the DTS measurement described herein.

DTS stands for Distributed Temperature Sensing. DTS is a technology which provides the user with a technique to measure the temperature distribution along a fiber optic line at any time and to repeat such measurements as required. The fiber optic line can be any length up to about 30 km (about 18.5 miles). With the exception of the recording instrumentation at one or sometimes both ends of the fiber, there are no electronics, no sensors, no electrical wires, or electrical connections required along the line.

DTS is inherently safe to use in environments where an electrical spark may pose a fire safety hazard. The fiber optic cable used may be standard 5/125 micrometer multimode type. Further, it should be appreciated that any suitable fiber optic cable may be used. DTS surveys provide both a qualitative view of the fiber (i.e., an overview) as well as a quantitative analysis (i.e., point temperature measurements). For the foregoing reasons, DTS provides a perfect technology for analyzing and modeling umbilical performance as well as pin pointing troublesome or dangerous conditions should they arise.

One method to measure the distributed temperature of an optical fiber is to send a pulse of light down the optical fiber and record the returning light. Distributed temperature sensing technology is derived from technology used in the telecommunication industry to measure the loss in fiber optic communication cables. As light travels down an optical fiber, a portion of the light is reflected back to the source of the light much like the blinding light a driver sees when driving through fog with your headlights on full beam. The reflected light the driver sees is caused by small water droplets suspended in the air acting like tiny glass beads, refracting and reflecting the light back to the car. In an optical fiber, the reflections back to the light source are caused by imperfections and materials added to the optical fiber. Along with the reflected light, light referred to as "backscatter" light can be measured from the optical fiber. Backscatter light is generated when the source light interacts with molecules in the optic fiber's glass core, generating light with different colors than the reflected light. By measuring the relative intensity of two of the backscattered light's colors (wavelength), the temperature of the optical fiber can be measured. Since the speed of light in glass is known, it is possible to determine, by tracking the arrival time of the reflected and backscattered light, the precise location of where the light came from. With knowledge of where the backscattered light came from and measuring the relative intensity of the backscatter light colors, a DTS instrument can produce a plot of the temperature versus distance along the optical fiber.

Figure 5:
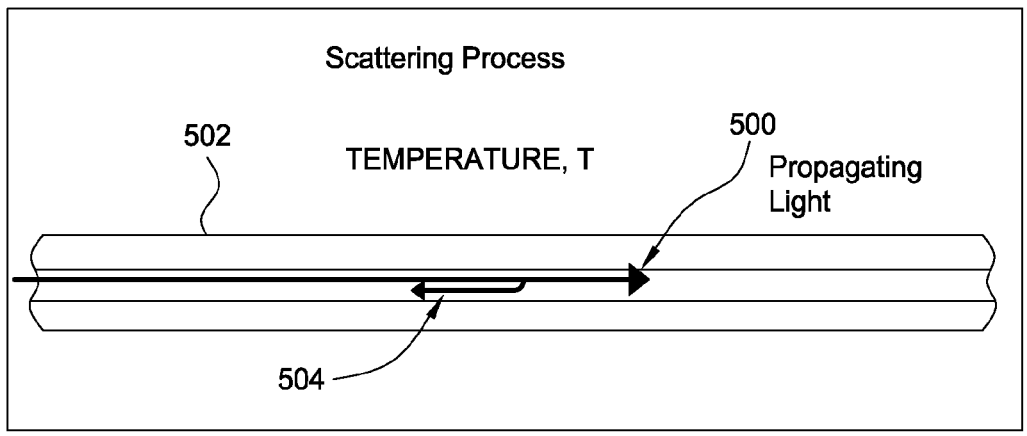
FIG. 5 is a schematic of a scattering of light in a fiber optic cable.

FIG. 5 shows light pulses 500 traveling down an optical fiber 502 that produces scattered optical signals 504. One backscatter measurement technique used by DTS instruments is Raman Backscatter (FIG. 6), which measures the molecular energy state of an optical fiber's glass core. The energy state is a measure of the optical fiber core's molecular vibration, which increases and decreases with temperature. When a pulse of light is transmitted down an optical fiber, Raman Backscatter is generated. Raman Backscatter is comprised of two components, the Stokes 600 and the Anti-Stokes 602. The intensity of the Anti-Stokes color band changes with temperature while the intensity of the Stokes color band remains practically constant. The relative intensities of the Stokes and Anti-Stokes signals are used to calculate the temperature in the fiber. By sampling at a time increment of 10 nanoseconds, a DTS instrument can collect temperature data points approximately every meter along the length of a fiber. The distance through an optical fiber that a DTS instrument can provide high-resolution temperature measurements is dependent on the instruments ability to detect the very weak returning Raman Backscatter signals. Good DTS instruments utilized can provide temperature measurements with 0.1° C. resolution at lengths of fiber up to 10 kilometers long.

Figure 6:
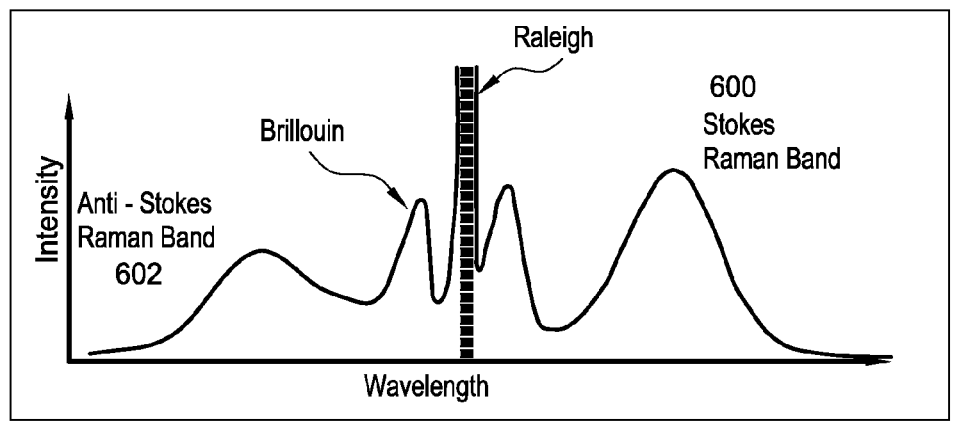
FIG. 6 is a depiction of Raman Backscatter and other backscatter.

FIG. 6 shows Raman Backscatter and other backscatter. Raman backscatter is comprised of two bands, Anti-Stokes, which changes with temperature, and Stokes band, which does not.

The equipment, for some embodiments, required to perform a Distributed Temperature Survey of a ROV umbilical—insitu—is listed below:

A. Lightbox. This may be a combined laser light source and backscatter opto-detector.

B. Connectors. Normally DTS equipment uses APC or E2000 connectors—these have far less impedance than the common SMA types seen in the ROV industry; however, it should be appreciated that any suitable connectors may be used.

C. Cable. The umbilical may contain a fiber optic cable which may be used as the sensing cable or dedicated fiber optic cable may be installed during the manufacture of the umbilical. Surface connection patch leads are required.

D. Calibration Equipment. DTS systems may need to be calibrated to a baseline for best accuracy. This may be done by correcting against several known highly accurate temperature measurements along the length of the measurement fiber. The usual tool is a set of thin film thermocouples with a meter.

E. Recording and Analysis Hardware. This varies from service company to service company, however, most use Intel based servers and industrial VMS style computers to gather and analyze the raw data from the lightboxes.

Figure 7:
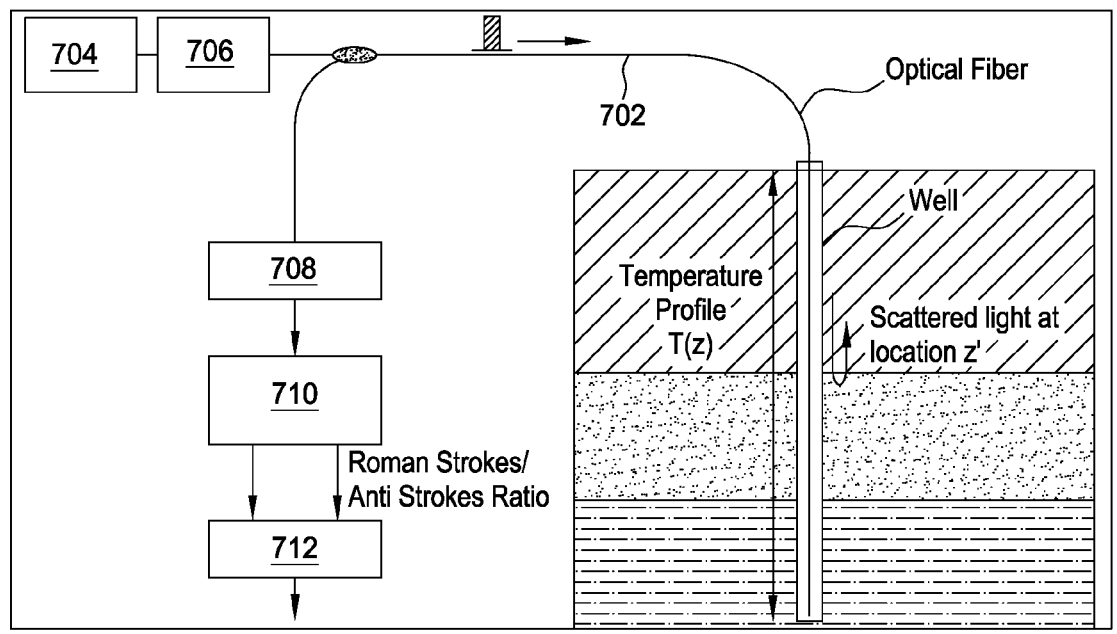
FIG. 7 is a diagram of typical equipment arrangement for use with the ROV umbilical.

FIG. 7 illustrates a connection arrangement shown in a diagram that is adapted for a well monitoring application. FIG. 7 shows an instrumentation system 700. The instrumentation system 700 sends and receives light into the and out of an optical fiber 702 in order to produce a DTS. The instrumentation system 700 as shown includes a laser source 704, a pulse module 706, a spectrometer 708, and one or more processors 710 and 712. It should be appreciated that any suitable instrumentation may be used so long as the instrumentation is capable of measuring and producing a distributed temperature profile and/or thermal gradient profile of the optical fiber. The temperature profile may be in real time or near real time. The temperature profile may be delivered to the operator by any suitable method including, but not limited to, a monitor, a printout, emailed to the operator, and delivered to a handheld device. Further, the instrumentation may record and store the temperature profile and data on a memory unit in order to analyze the conditions of the umbilical at a later time.

FIG. 8 is a schematic view of an umbilical 800 used in one embodiment. The umbilical 800 includes the optical fiber 702. The optical fiber 702 may have been manufactured in the umbilical specifically for DTS, or may have been an optical fiber used for another application which is now coupled to the instrumentation 700 for producing the thermal gradient profile. The umbilical 800 is coupled to a delivery device 804 on a first end and a ROV 806 on another end. The delivery device 804, as shown, is a spool/winch capable of spinning in order to release or retract the umbilical 800. It should be appreciated that any suitable delivery device may be used. The optical fiber 702 is coupled to the instrumentation 700 in order to interrogate the optical fiber 702 with light and receive and analyze the scattered light from the fiber 702.

FIG. 8 shows the ROV 806 being used from a vessel 807 in a subsea pipeline 808. The vessel 807 with the ROV 806, the delivery device 804, and the instrumentation 700 is manipulated to a location near the pipeline 808. The ROV 806 is then deployed into the sea 810. An operator aboard the vessel 807, or at a remote location, operates the ROV 806 via remote control while delivering commands to the ROV 806 via the umbilical 800. The ROV 806 may be equipped with a propulsion system, a steering system, monitors, sensors, lights, cameras, robotic arms, sample collection devices, and any number of tools depending on the specific job to be performed. The operator manipulates the ROV 806 to the location of the job to be performed, shown in FIG. 8 as the pipeline 808. An operation or operations are then performed and the ROV 806 is returned to the vessel 807. Although described as the ROV 806 being manipulated from a vessel 807 it should be appreciated that the ROV 806 may be used from any device or location. Further, the ROV 806 may be used at a location other than a pipeline including, but not limited to, a shipwreck, a natural underwater formation, a mine, a wellbore, space, and a volcano. The ROV 806 may be used to perform any number of tasks once deployed including, but not limited to, remediation of pipelines, remediation of wellbores, mapping, and information gathering. It should be appreciated that the vessel may be any device suitable for delivering the ROV 806 to a location including, but not limited to, a truck, a car, a trailer, a plane, a helicopter, a cart, a bag, and a space craft.

During the transport and operation of the ROV 806, the instrumentation 700 may be used to determine the temperature in the umbilical 800, as described above. The temperature may assist the operator in determining a number of conditions of the umbilical including, but not limited to, overheating in the umbilical, weak spots in the umbilical, the location of water, and water in the umbilical. With the real time temperature data, the operator may increase or decrease the power supplied to the ROV during an operation based on the data. Further, the data from the operation may be used in the design and sizing of umbilicals to be manufactured in the future.

The foregoing solution provides a thermal gradient profile to the operator in near real time. Some embodiments enable use of existing fiber optics present in an umbilical with no external sensors required. Embodiments may offer real time monitoring of umbilical throughout entire sections including rotary slip joints and surface hook up cables. Furthermore, embodiments may provide indications of water ingress, slip ring failure, overload detection, and/or excessive umbilical turns.

While the foregoing is directed to embodiments of the present invention, other and further embodiments of the invention may be devised without departing from the basic scope thereof, and the scope thereof is determined by the claims that follow.

What is claimed is:

1. A method of operating a remotely operated vehicle, comprising:

supplying power to the remotely operated vehicle through an umbilical;

manipulating the remotely operated vehicle to a location to perform a task;

propagating light down an optical fiber located in the umbilical;

providing a distributed temperature profile of the umbilical based on backscatter light from the optical fiber during operation; and adjusting the power based on the distributed temperature profile.

2. The method of claim 1, further comprising analyzing the distributed temperature profile during operation of the remotely operated vehicle.

3. The method of claim 2, further comprising adjusting the power supply to the remotely operated vehicle based on the analysis of the distributed temperature profile.

4. The method of claim 2, further comprising designing a second umbilical based on the analysis.

5. The method of claim 1, wherein the task further comprises remediating a subsea pipeline.

6. The method of claim 1, further comprising supplying operating instructions to the remotely operated vehicle through the umbilical.

7. The method of claim 1, further comprising displaying the distributed temperature profile to an operator on a screen.

8. The method of claim 7, wherein the screen is on a hand held device.

* * * * *